United States Patent Office 2,889,379
Patented June 2, 1959

2,889,379

PREPARATION OF 3,3,3-TRIFLUOROPROPENE

Robert P. Ruh, Robert A. Stowe, and Ralph A. Davis, Midland, Mich., assignors to The Dow Chemical Company, Midland, Mich., a corporation of Delaware No Drawing. Application February 6, 1957
Serial No. 638,461

16 Claims. (Cl. 260—653.4)

This invention relates to the fluorination of halogenated propanes and propenes and is more particularly concerned with the preparation of 3,3,3-trifluoropropene by a vapor phase fluorination over a particular catalyst to obtain outstanding yields.

3,3,3-trifluoropropene has been described in the art as being preparable from $CCl_3CH_2CH_2Cl$ by liquid phase fluorination in the presence of an antimony fluoride catalyst (Henne and Kay, J. A. C. S. 72, 3369 (1950)). Using this starting material, considerable amounts of undesirable by-products were produced, which reduced the efficiency of the process and decreased the yields of the desired trifluoropropene. Additionally, when the process was applied to a similar starting material, $CCl_3CH_2CH_2Br$, only tars and by-products could be separated from the reaction mixture; apparently little, if any trifluoropropene, was prepared.

It is, therefore, a principal object of the present invention to provide a process for the preparation of 3,3,3-trifluoropropene which results in almost quantitative yields of the desired product. Another object of the present invention is the provision of a process for the preparation of 3,3,3-trifluoropropene which uses a wide variety of starting materials to give high yields of the desired product. Still another object of the present invention is to provide a vapor phase hydrogen fluoride fluorination procedure for the preparation of 3,3,3-trifluoropropene. Other objects will become apparent hereinafter.

The above and additional objects are accomplished by fluorinating with hydrogen fluoride a three carbon atom halogenated hydrocarbon containing from three to four hydrogen atoms and from three to four halogen atoms other than iodine, not more than two of which are fluorine, one terminal carbon atom containing no hydrogen thereon. Fluorination is accomplished in the vapor phase by passing a gaseous mixture of hydrogen fluoride and the organic material into a reaction zone maintained at a temperature above 150 degrees centigrade and containing a chromium oxyfluoride catalyst. A mole ratio of HF to organic of at least 3.0 should be introduced and the reactants should have a catalyst contact time of at least 0.5 second. Using these specific conditions it is possible to obtain yields of 3,3,3-trifluoropropene approaching 100 percent and conversions of the organic material approaching 100 percent.

While reaction temperatures as low as 150 degrees centigrade are operative, a minimum temperature in the reaction zone of 225 degrees centigrade is preferred, and temperatures from 300–400 degrees centigrade are desired and 350 degrees centigrade usually employed. Usually temperatures below those at which substantial pyrolysis occurs are employed and preferably the temperature is maintained below 600 degrees centigrade. A contact time from 5–6 seconds is desired, but contact times as low as 0.5 second and as long as possible in the equipment employed constitute a minimum and maximum range. A mole ratio of HF to organic material introduced from 3.0 to the economic limits of the specific process is operable, however, mole ratios from 7 to 18 are preferred and from 10–12 usually used commercially. Pressures approximately those at atmospheric are usually employed, although higher or lower pressures may be employed, if desired. In order to protect the reactor and associated equipment, the reaction is usually run under anhydrous conditions.

The specific catalyst required by the process of the present invention is a chromium oxyfluoride, as described and claimed in U.S. Patent 2,745,886. This catalyst is readily prepared by contacting oxygen and a hydrate of chromium fluoride at a temperature of 500 degrees centigrade. After the fluorination reaction has been run for a time, usually less than 10 hours, reactivation as described in the above-identified patent may be required. Mixing the chromium oxyfluoride with aluminum fluoride will extend the catalyst life, however. Reactivation is readily accomplished by passing oxygen or an oxygen-containing gas over the catalyst heated at about 500 degrees centigrade.

Three carbon atom halogenated hydrocarbons containing from three to four hydrogen atoms and from three to four halogen atoms other than iodine, not more than two of which are fluoride, one terminal carbon atom containing no hydrogen thereon, which are suitable as starting materials for the process of the present invention include, for example, 3,3,3-trichloropropene, 3,3,3-tribromoproprene, 3,3-dichloro-3-bromopropene, 1,1,1,3-tetrachloropropane, 1,1,1,3-tetrabromopropane, 3,3-dichloro-3-fluoropropene, 3,3-dibromo-3-fluoropropene, 3-bromo-3,3-difluoropropene, 3-dichloro-3,3-difluoropropene, 1,1,3-trichloropropene-1, 1,1-dichloro-3-bromopropene-1, 1,3-dichloro - 1,1 - difluoropropane, 1,1,1 - trichloro - 3 - bromopropane, etc.

Since the product boils at approximately —25 degrees centigrade, a reactor effluent collection train of a scrubber, a water-cooled condenser, and a Dry Ice cooled condenser is usually employed to remove unreacted material and collect the product. 3,3,3-trifluoropropene is a colorless gas boiling at approximately —25 degrees centigrade, and having utility as a reactive intermediate for introducing the trifluoromethyl group into various types of products.

The following examples are given to illustrate the process of the present invention but are not to be construed as limiting the invention thereto.

*Exmaple I*

A mixture of 90.75 pounds of basic chromium fluoride and 22.75 pounds of technical hydrated aluminum fluoride was slurried with 4.5 gallons of 18 percent hydrogen fluoride and 3.4 pounds of sugar added to the slurry and thoroughly mixed. The slurry was dried to a cake in a steam oven heated at 80–90 degrees centigrade, broken up to form particle sizes sufficient that all would pass a 12 mesh screen, and pelleted with 2 percent graphite. The pelleted catalyst (1320 cc.) was charged to 2" x 30" nickel reactor and contacted with oxygen for four hours at 550 degrees centigrade.

Thereafter, a mixture of 2405 grams (13.2 moles) of 1,1,1,3-tetrachloropropane and 3016 grams (150.8 moles) of HF was passed through the reactor into contact with the catalyst. The temperature of the reactor was maintained at 350 degrees centigrade, and the inlet vaporizer temperature was also maintained at 350 degrees centigrade. The mole ratio of HF to tetrachloropropane was 11.4 and the length of the run was six hours. Thus, the contact time was 3.4 seconds. The products from the reactor were led to a Dry Ice cooled trap and 1173 grams of material collected. There was obtained a conversion to 3,3,3-trifluoropropene of 94.2 percent and an organic recovering of 97.6 percent.

*Example II*

A catalyst prepared in a manner similar to that of Example I was placed in the same reactor, and a mixture of 498 grams (3.42 moles) of 3,3,3-trichloropropene and 41.8 gram moles of HF passed through over a period of 2.7 hours. The vaporizer temperature and furnace temperature were 350 degrees centigrade, the contact time was 5.6 seconds, and the HF/organic ratio was 12.2. There was recovered in the cold trap, 318 grams, or a conversion based on the weight of the cold trap material of 97.0 percent, and a titrated conversion of 100 percent of 3,3,3-trifluoropropene.

*Example III*

In a manner similar to that of Examples I and II, 3215 grams (14.2 gram moles) of 1-bromo-3,3,3-trichloropropane and 187.8 gram moles of HF were passed through the reactor. The HF/organic mole ratio was 13.2, length of run was 7 hours and the contact time was 3.22 seconds. 1393 Grams of product were obtained, and a 100 percent titrated conversion to 3,3,3-trifluoropropene.

*Example IV*

In a manner similar to that of Example I, 371.8 gram moles of HF and 4,054 grams (22.3 gram moles) of $CCl_3$—$CH_2$—$CH_2Cl$ were charged to a reactor maintained at a temperature of 350 degrees centigrade, the length of the run being 21.0 hours and the mole ratio of HF to organic being 16.7. At a contact time of 4.9 seconds, 2,047 grams of material were collected in the Dry-Ice cooled trap. A titrated conversion to 1,1,1-trifluoropropene of 99.8 percent and an organic recovery of 99.5 percent was obtained.

*Example V*

In a manner similar to that of the foregoing examples, an additional run was conducted with the following results:

|  | Run 5 |
|---|---|
| Furnace temp., °C | 350 |
| Vaporizer temp., °C | 350 |
| HF charged, gm. moles | 187.8 |
| $CCl_3CH_2CH_2Br$, gms | 3215 |
| HF/organic mole ratios | 13.2 |
| Length of run_____hours | 7 |
| Contact time_____sec | 3.22 |
| Recovery in Dry-Ice trap____gms | 1393 |
| Titrated conversion_____percent | 100 |

*Example VI*

A 6 inch by 7 foot reactor heated with a 220 volt furnace was charged with 34 liters of a chromium oxyfluoride catalyst prepared as described in U.S. Patent 2,745,886 and the reactor heated to 350 degrees centigrade. The following table summarizes the results over an extended period, with 1-bromo-3,3,3-trichloropropane when the procedure of the foregoing examples was repeated.

| Time | 16–24 hours | 117–125 hours | 125–133 hours |
|---|---|---|---|
| Average organic feed rate, gram moles/hour | 13.75 | 12.45 | 14.7 |
| Total organic fed, gram moles | 111.0 | 99.6 | 117.5 |
| Average HF feed rate, gram moles/hour | 188.2 | 193.0 | 193.0 |
| Total HF fed, gram moles | 1,595 | 1,638 | 1,638 |
| Mole ratio HF/organic | 13.7 | 15.5 | 13.13 |
| Contact time, seconds | 11.74 | 11.54 | 11.43 |
| Conversion to $CF_3$–$CH_2$=CH | 93.2 | 96.5 | 97.0 |
| Organic recovery | 96.9 | 96.5 | 98.5 |

In a manner similar to that of the foregoing examples other propanes and propenes as previously described may be reacted to prepare 3,3,3-trifluoropropene.

Various modifications may be made in the method of the present invention without departing from the spirit or scope thereof, and it is to be understood that we limit ourselves only as defined in the appended claims.

We claim:

1. A process for the preparation of 3,3,3-trifluoropropene which comprises: contacting hydrogen fluoride and a three carbon atom halogenated hydrocarbon containing from 3 to 4 hydrogen atoms and from 3 to 4 halogen atoms other than iodine, not more than two of which are fluorine, one terminal carbon atom containing no hydrogen thereon, said contacting being for a contact time of at least 0.5 second, at a temperature above 150 degrees centigrade, in the presence of a chromium oxyfluoride catalyst, and at a mole ratio of at least 3.0 to 1.0 hydrogen fluoride to organic; and, separating 3,3,3-trifluoropropene from the reaction mixture.

2. A process for the preparation of 3,3,3-trifluoropropene which comprises: contacting hydrogen fluoride and a three carbon atom halogenated hydrocarbon containing from 3 to 4 hydrogen atoms and from 3 to 4 halogen atoms other than iodine, not more than two of which are fluorine, one terminal carbon atom containing no hydrogen thereon, said contacting being for a contact time of at least 3 seconds, at a temperature between 225–600 degrees centigrade, in the presence of a chromium oxyfluoride catalyst, and at a mole ratio of at least 7–18 to 1 hydrogen fluoride to organic; and, separating 3,3,3-trifluoropropene from the reaction mixture.

3. A process for the preparation of 3,3,3-trifluoropropene which comprises: contacting hydrogen fluoride and a three carbon atom halogenated hydrocarbon containing from 3 to 4 hydrogen atoms and from 3 to 4 halogen atoms other than iodine, not more than two of which are fluorine, one terminal carbon atom containing no hydrogen thereon, said contacting being for a contact time of at least 5 to 6 seconds, at a temperature between 300–400 degrees centigrade, in the presence of a chromium oxyfluoride catalyst, and at a mole ratio of at least 10–12 to 1 hydrogen fluoride to organic; and, separating 3,3,3-trifluoropropene from the reaction mixture.

4. A process for the preparation of 3,3,3-trifluoropropene which comprises: contacting hydrogen fluoride and a three carbon atom halogenated hydrocarbon containing from 3 to 4 hydrogen atoms and from 3 to 4 halogen atoms other than iodine, not more than two of which are fluorine, one terminal carbon atom containing no hydrogen thereon, said contacting being for a contact time of at least 5 to 6 seconds, at a temperature of 350 degrees centigrade, in the presence of a chromium oxyfluoride catalyst, and at a mole ratio of at least 10–12 to 1 hydrogen fluoride to organic; and, separating 3,3,3-trifluoropropene from the reaction mixture.

5. A process for the preparation of 3,3,3-trifluoropropene which comprises: contacting, for a contact time of at least 0.5 second, at a temperature above 150 degrees centigrade, and in the presence of a chromium oxyfluoride catalyst, at least a 3.0 to 1.0 mole ratio of hydrogen fluoride and 1,1,1,3-tetrachloropropane, and, separating 3,3,3-trifluoropropene from the reaction mixture.

6. A process for the preparation of 3,3,3-trifluoropropene which comprises: contacting, for a contact time of at least three seconds and at a temperature between 225 and 600 degrees centigrade and in the presence of a chromium oxyfluoride catalyst, a 7–18 to 1 mole ratio of hydrogen fluoride and 1,1,1,3-tetrachloropropane, and, separating 3,3,3-trifluoropropene from the reaction mixture.

7. A process for the preparation of 3,3,3-trifluoropropene which comprises: contacting, for a contact time of 5–6 seconds and at a temperature between 300 and 400 degrees centigrade and in the presence of a chromium oxyfluoride catalyst, a 10–12 to 1 mole ratio of hydrogen fluoride and 1,1,1,3-tetrachloropropane, and, separating 3,3,3-trifluoropropene from the reaction mixture.

8. A process for the preparation of 3,3,3-trifluoropropene which comprises: contacting, for a contact time of 5-6 seconds and at a temperature of 350 degrees centigrade and in the presence of a chromium oxyfluoride catalyst, a 10–12 to 1 mole ratio of hydrogen fluoride and 1,1,1,3-tetrachloropropane, and, separating 3,3,3-trifluoropropene from the reaction mixture.

9. A process for the preparation of 3,3,3-trifluoropropene which comprises: contacting, for a contact time of at least 0.5 second, at a temperature above 150 degrees centigrade, and in the presence of a chromium oxyfluoride catalyst, at least a 3.0 to 1.0 mole ratio of hydrogen fluoride and 3-bromo-1,1,1-trichloropropane, and, separating 3,3,3-trifluoropropene from the reaction mixture.

10. A process for the preparation of 3,3,3-trifluoropropene which comprises: contacting, for a contact time of at least three seconds and at a temperature between 225 and 600 degrees centigrade and in the presence of a chromium oxyfluoride catalyst, a 7–18 to 1 mole ratio of hydrogen fluoride and 3-bromo-1,1,1-trichloropropane, and, separating 3,3,3-trifluoropropene from the reaction mixture.

11. A process for the preparation of 3,3,3-trifluoropropene which comprises: contacting, for a contact time of 5-6 seconds and at a temperature between 300 and 400 degrees centigrade and in the presence of a chromium oxyfluoride catalyst, a 10–12 to 1 mole ratio of hydrogen fluoride and 3-bromo-1,1,1-trichloropropane, and, separating 3,3,3-trifluoropropene from the reaction mixture.

12. A process for the preparation of 3,3,3-trifluoropropene which comprises: contacting, for a contact time of 5-6 seconds and at a temperature of 350 degrees centigrade and in the presence of a chromium oxyfluoride catalyst, a 10–12 to 1 mole ratio of hydrogen fluoride and 3-bromo-1,1,1-trichloropropane, and, separating 3,3,3-trifluoropropene from the reaction mixture.

13. A process for the preparation of 3,3,3-trifluoropropene which comprises: contacting, for a contact time of at least 0.5 second, at a temperature above 150 degrees centigrade, and in the presence of a chromium oxyfluoride catalyst, at least a 3.0 to 1.0 mole ratio of hydrogen fluoride and 3,3,3-trichloropropene, and, separating 3,3,3-trifluoropropene from the reaction mixture.

14. A process for the preparation of 3,3,3-trifluoropropene which comprises: contacting, for a contact time of at least three seconds and at a temperature between 225 and 600 degrees centigrade and in the presence of a chromium oxyfluoride catalyst, a 7–18 to 1 mole ratio of hydrogen fluoride and 3,3,3-trichloropropene, and, separating 3,3,3-trifluoropropene from the reaction mixture.

15. A process for the preparation of 3,3,3-trifluoropropene which comprises: contacting, for a contact time of 5-6 seconds and at a temperature between 300 and 400 degrees centigrade and in the presence of a chromium oxyfluoride catalyst, a 10–12 to 1 mole ratio of hydrogen fluoride and 3,3,3-trichloropropene, and, separating 3,3,3-trifluoropropene from the reaction mixture.

16. A process for the preparation of 3,3,3-trifluoropropene which comprises: contacting, for a contact time of 5-6 seconds and at a temperature of 350 degrees centigrade and in the presence of a chromium oxyfluoride catalyst, a 10–12 to 1 mole ratio of hydrogen fluoride and 3,3,3-trichloropropene, and, separating 3,3,3-trifluoropropene from the reaction mixture.

References Cited in the file of this patent

UNITED STATES PATENTS

| | | |
|---|---|---|
| 2,745,886 | Ruh et al. | May 15, 1956 |
| 2,787,646 | Haszeldine | Apr. 2, 1957 |

OTHER REFERENCES

Henne et al.: Jour. Amer. Chem. Soc., vol. 72, p.3369.